United States Patent [19]
Kalkman et al.

[11] Patent Number: 5,823,712
[45] Date of Patent: Oct. 20, 1998

[54] METHOD AND INSTALLATION FOR LAYING A PIPELINE ON A SURFACE LOCATED UNDER WATER

[75] Inventors: Piet Kalkman, Waddinxveen; Joop Roodenburg, Delft; Anne Klaas de Groot, Odijk, all of Netherlands

[73] Assignee: Allseas Group S.A., Chatel-St. Denis, Switzerland

[21] Appl. No.: 613,190

[22] Filed: Mar. 8, 1996

[30]     Foreign Application Priority Data

Mar. 10, 1995 [NL]  Netherlands ............................ 9500485

[51] Int. Cl.⁶ ...................................................... F16L 1/12
[52] U.S. Cl. ............................. 405/165; 405/166; 405/158
[58] Field of Search ...................................... 405/158, 165, 405/166, 168.1, 168.4, 169, 170

[56]     References Cited

U.S. PATENT DOCUMENTS

| | | | |
|---|---|---|---|
| 3,491,541 | 1/1970 | Berard | 405/166 |
| 3,739,971 | 6/1973 | Silvestri et al. | 405/168.4 X |
| 3,975,919 | 8/1976 | Harrison | 405/166 |
| 5,044,825 | 9/1991 | Kaldenbach | 405/166 |
| 5,413,434 | 5/1995 | Stenfert et al. | 405/168.1 X |

*Primary Examiner*—Tamara L. Graysay
*Assistant Examiner*—Frederick L. Lagman
*Attorney, Agent, or Firm*—Mark Zovko

[57]     ABSTRACT

A method for laying a pipeline on a surface located under water such as a deep sea bed. The pipeline is held fixedly by tensioners having tensioning elements each extending between a clamping member engaging on the pipeline and a support member connected to a vessel. Tensioning is accomplished by sets of endless clamping bands which apply a braking action to the pipeline. A set of clamping jaws is clamped fixedly to the pipeline and moves along with the pipeline from a starting position to a releasing position. As a set of clamping jaws is clamped to the pipeline, another set of clamping jaws is released from the pipeline and returned to a starting position to continually repeat the cycle of holding and releasing of the pipeline.

8 Claims, 15 Drawing Sheets

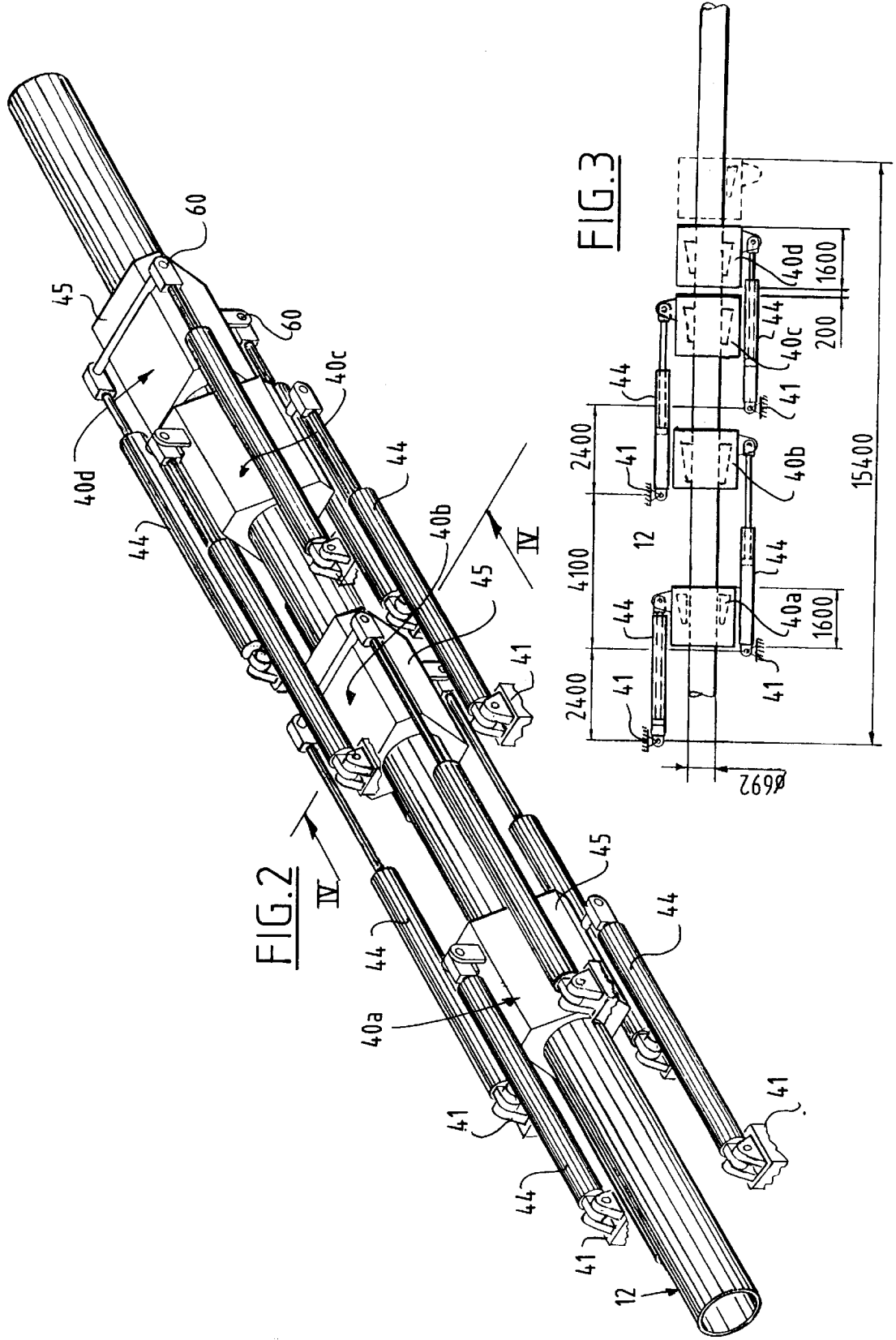

METHOD AND INSTALLATION FOR LAYING A PIPELINE ON A SURFACE LOCATED UNDER WATER

The invention relates to a method for laying a pipeline on a surface located under water.

Such a method is known for instance from U.S. Pat. No. 5,044,825. The tensioning means consist herein of a plurality of sets of endless clamping bands which apply a braking action to the pipeline. Such a method is not practically suitable for laying a heavy pipeline on for instance a deep sea-bed.

The invention has for its object to provide a method and installation which is practically suitable for this purpose.

The relevant method and installation according to the invention are designated in claim 1 and claim 2 respectively.

The method and installation according to the invention, and particularly preferred embodiments thereof, are described with reference to drawings, in which:

FIGS. 2 and 3 show on larger scale respectively a perspective view and a working diagram of detail II of FIG. 1;

FIG. 6A shows detail VIA of FIG. 6;

Figure 4:
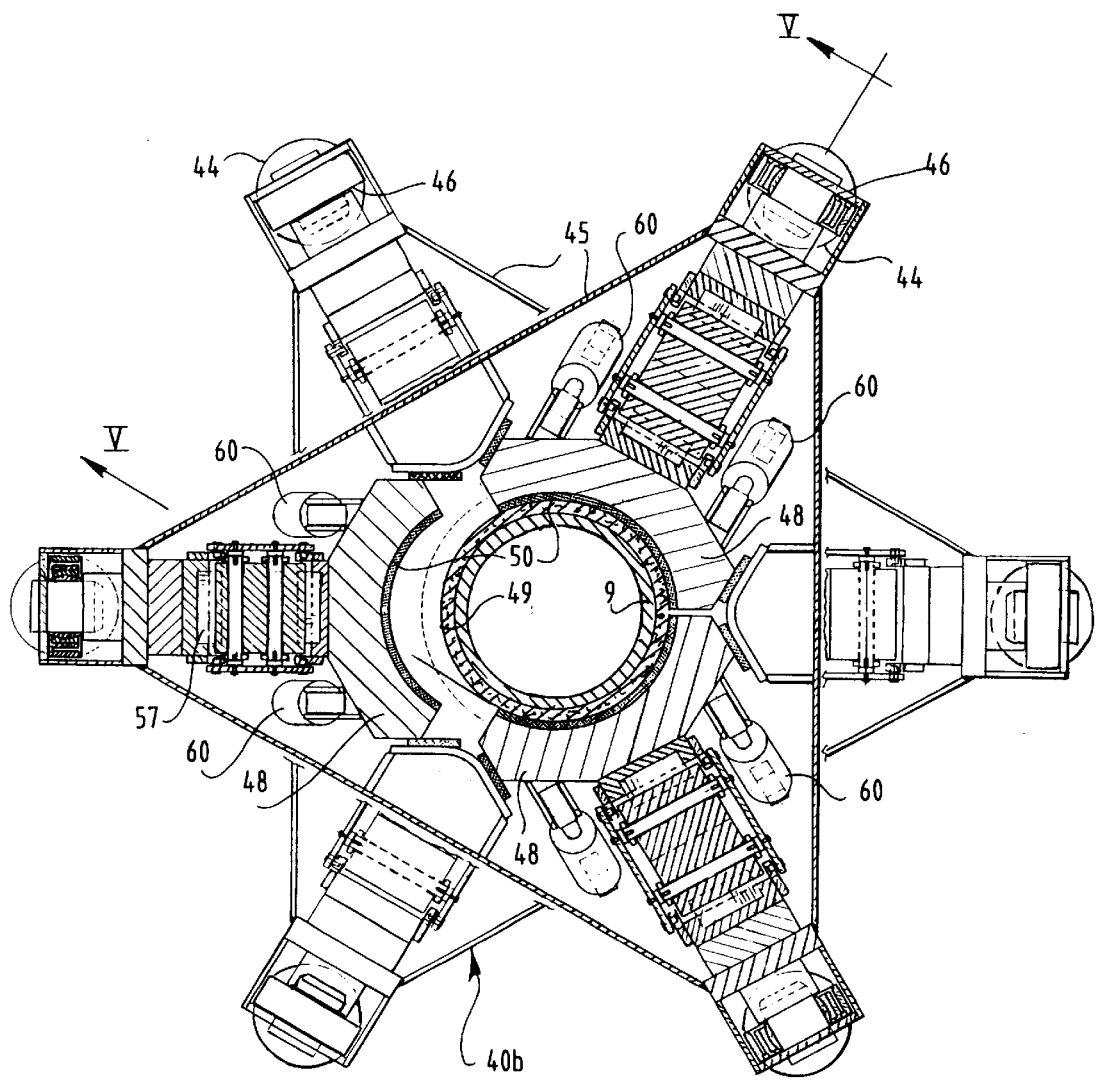
FIG. 4 shows on a larger scale cross section IV—IV of FIG. 2.
Figure 7:
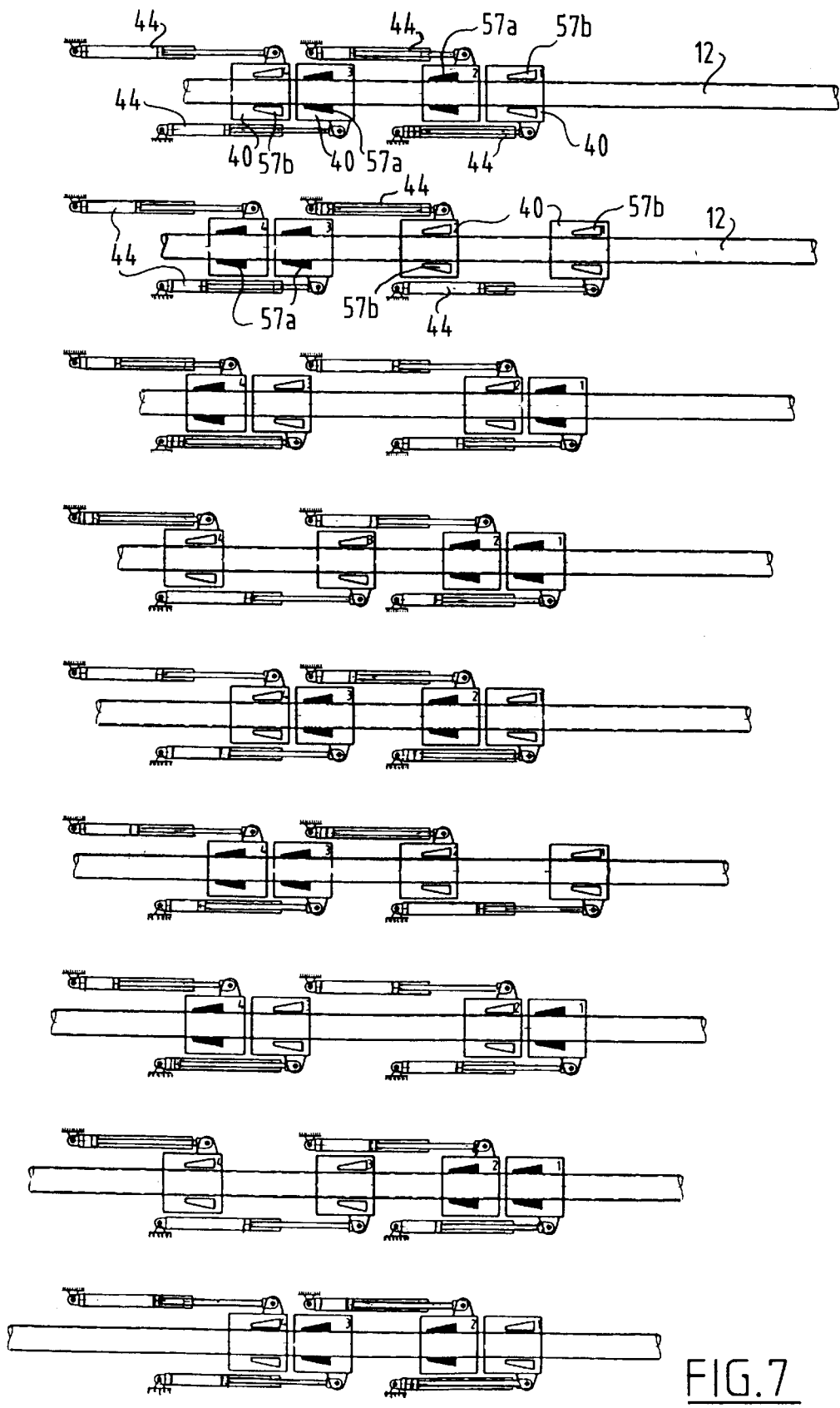
Figure 8:
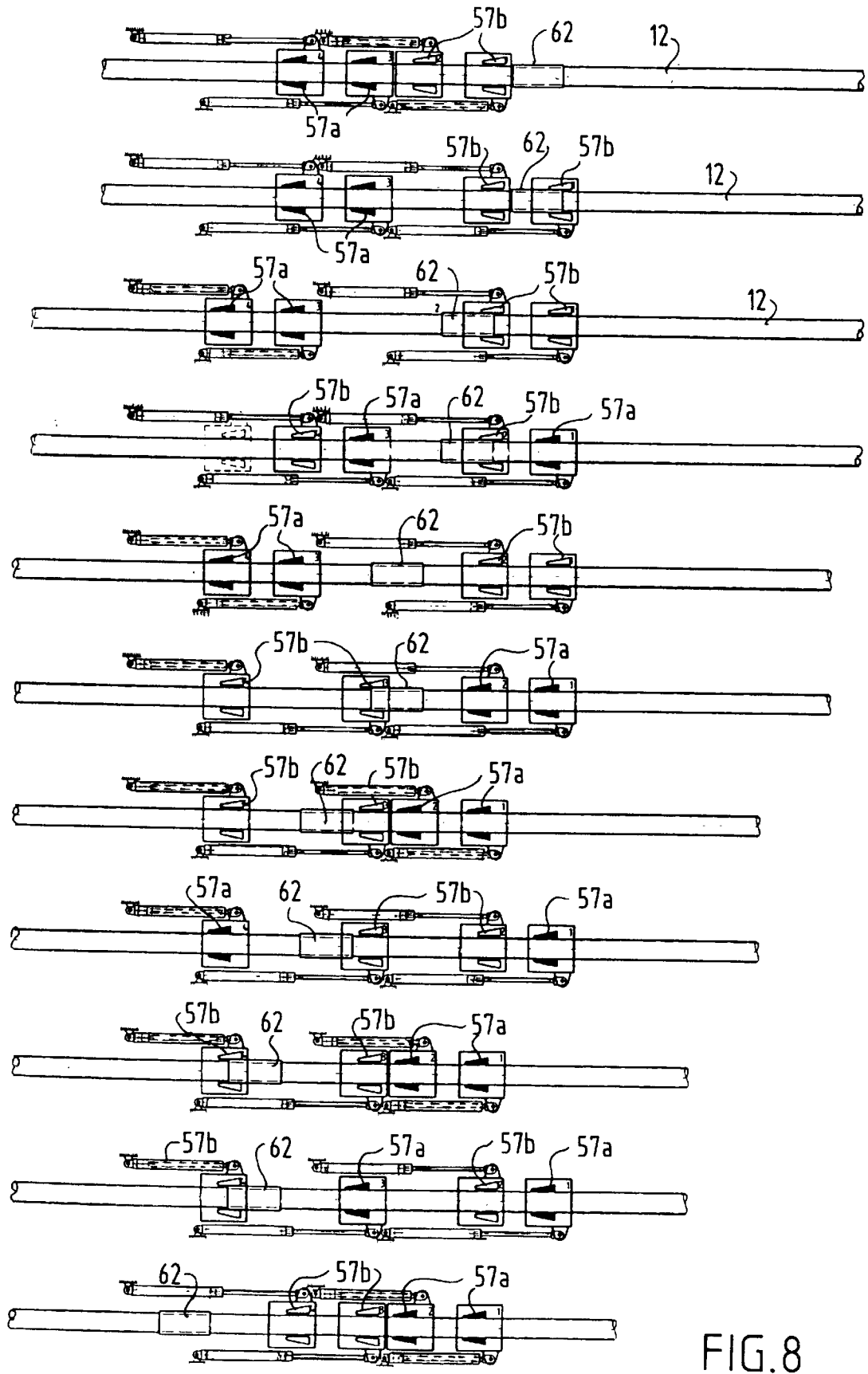
Figure 9:
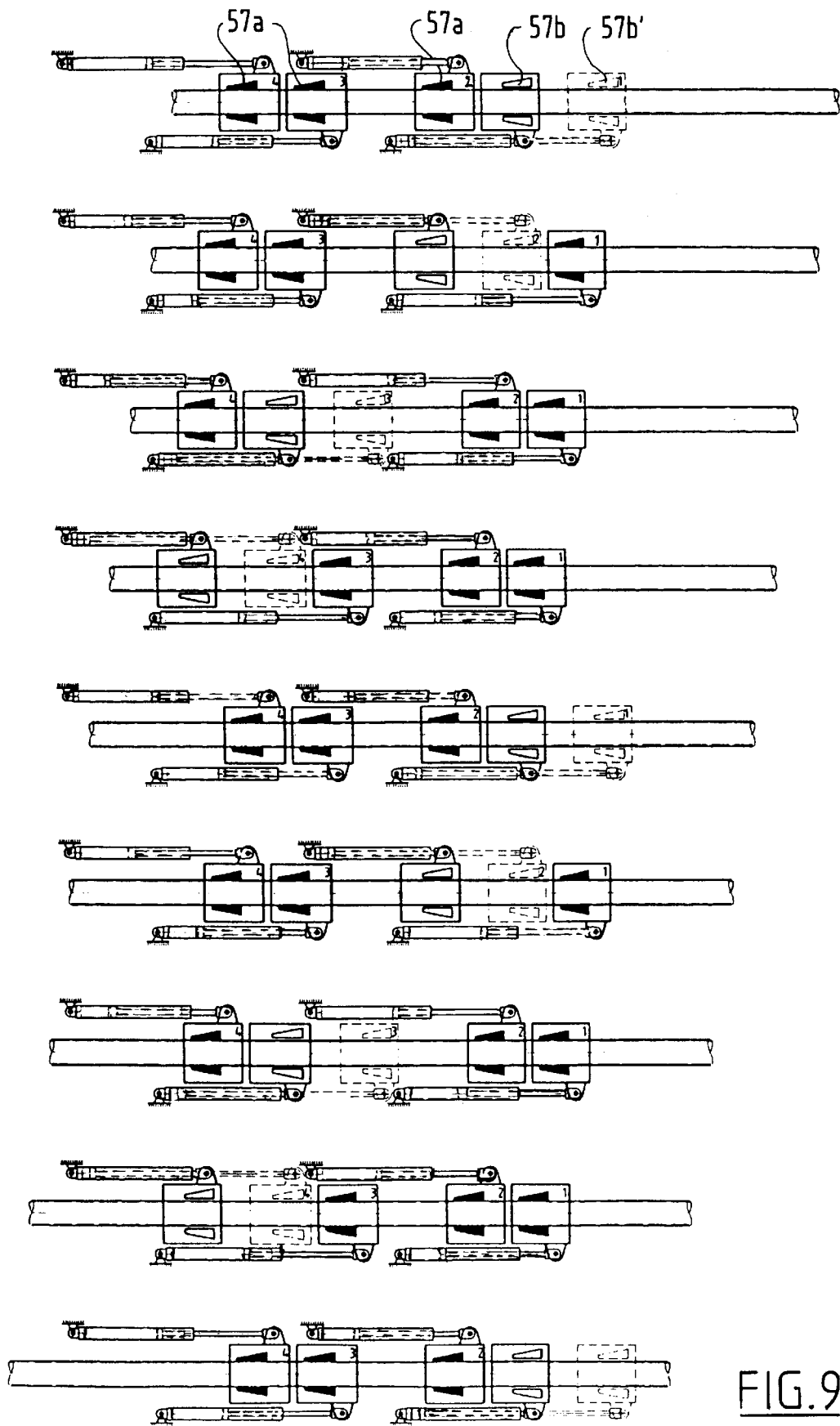
Figure 10:
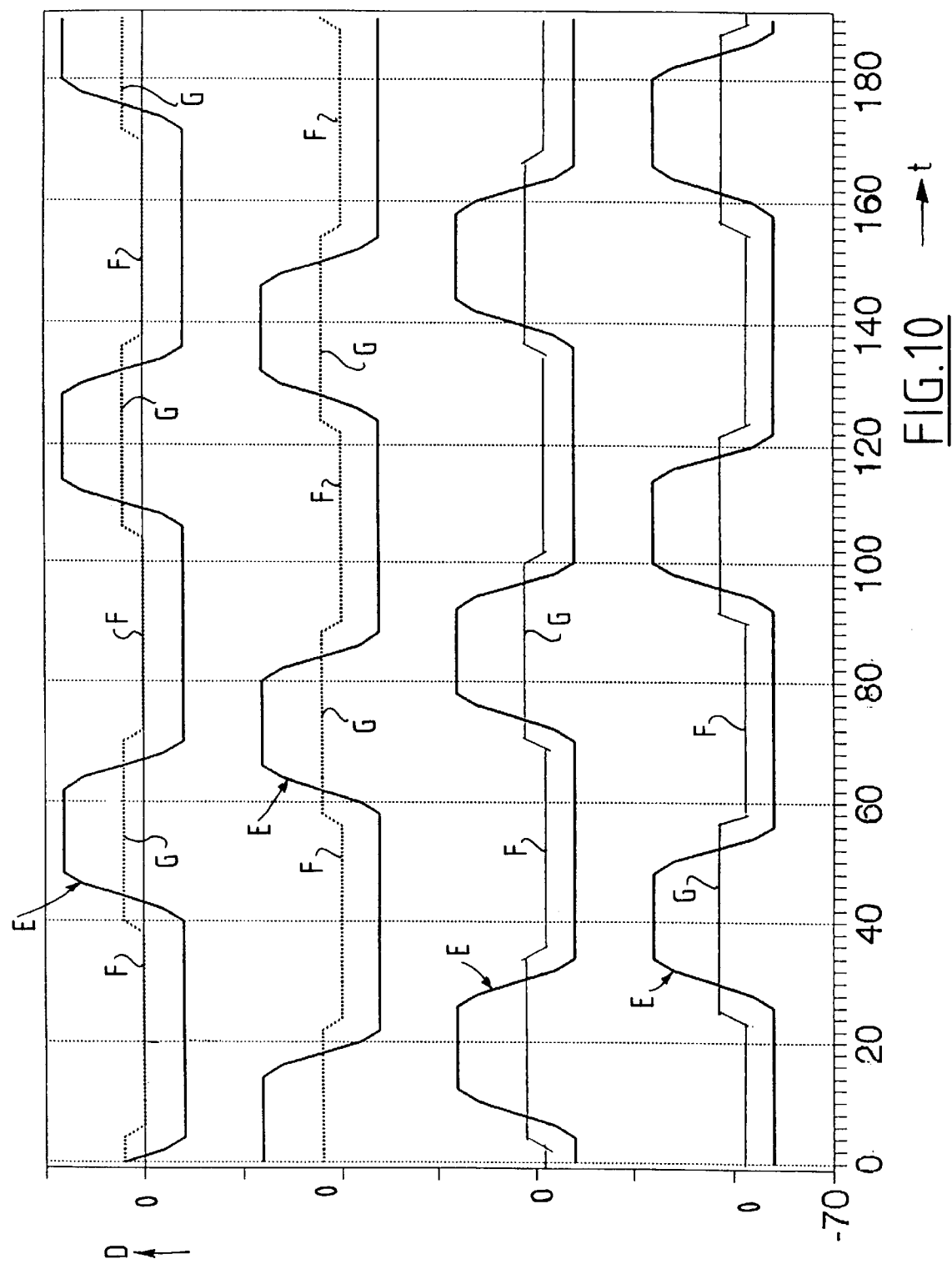
Figure 11:
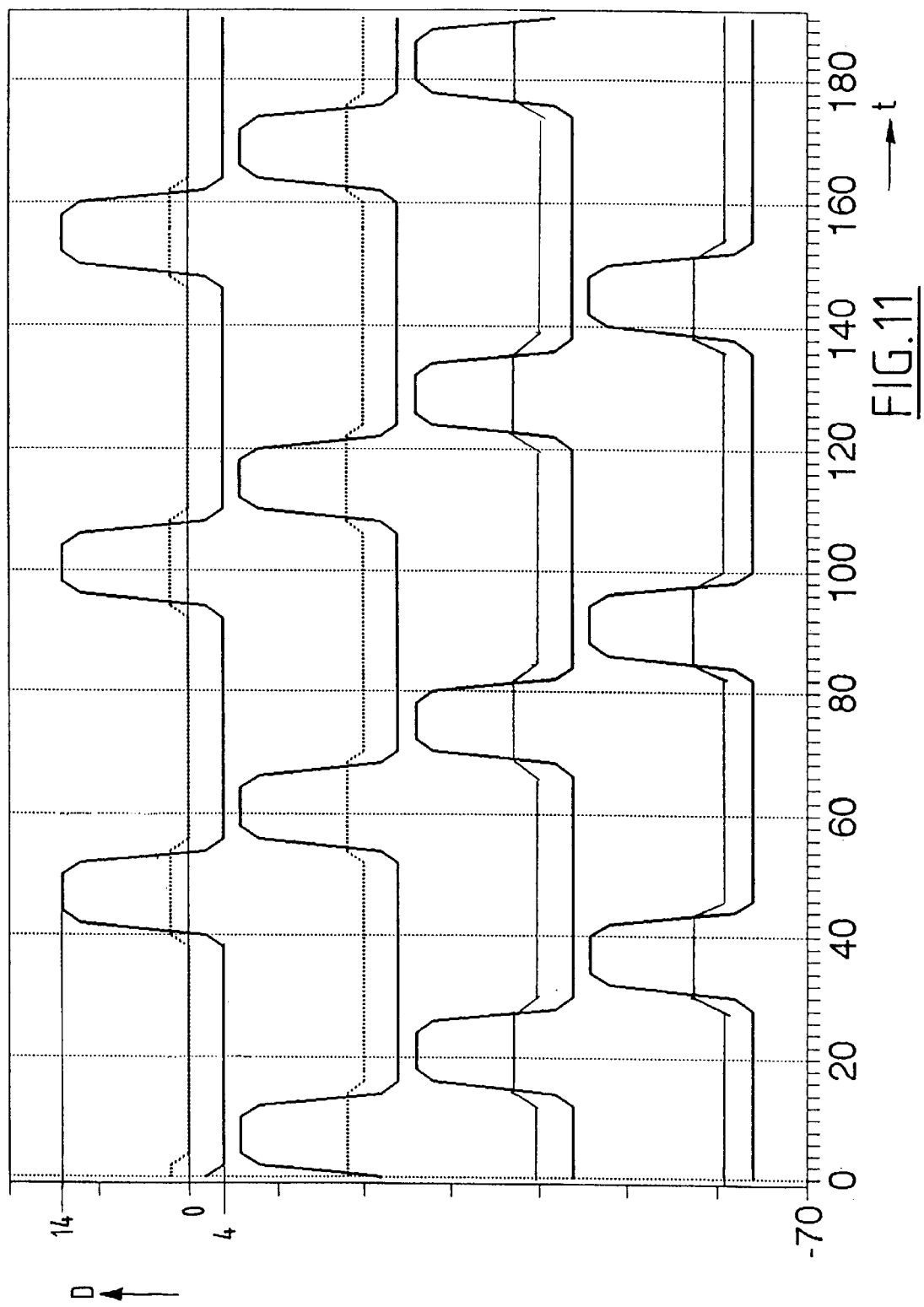
Figure 12:
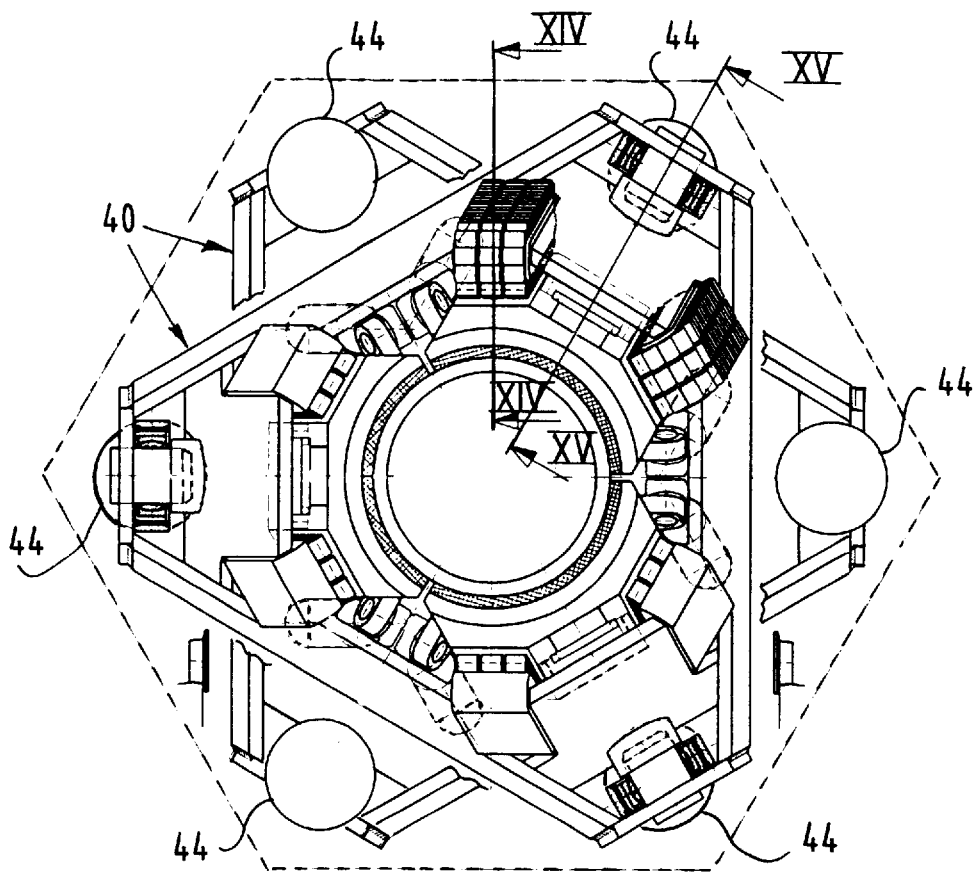
Figure 13:
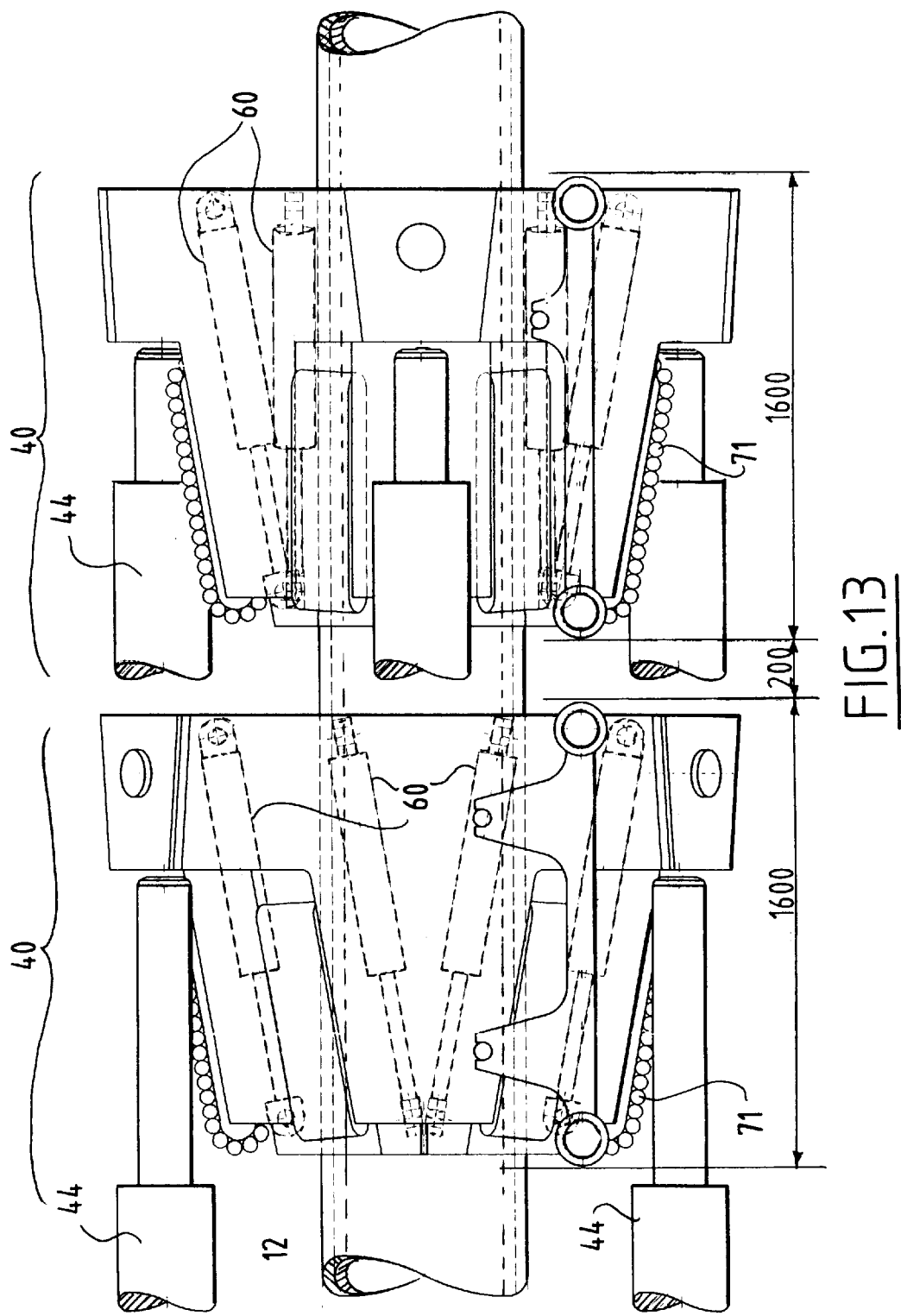
Figure 15:
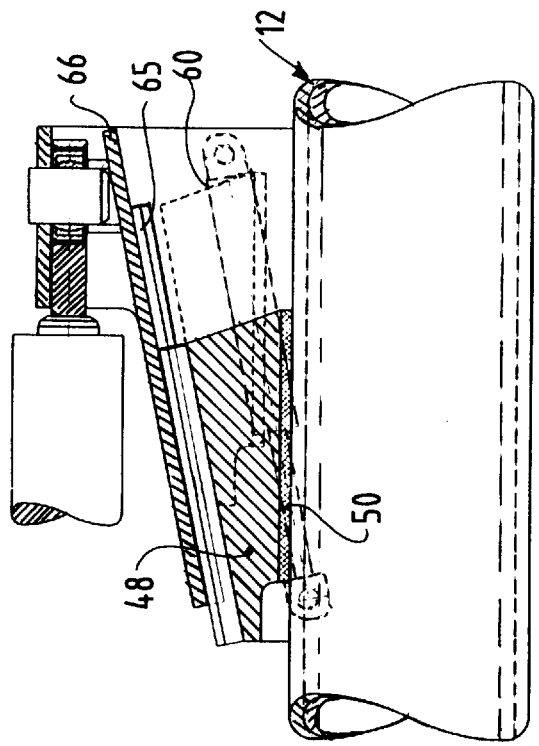
Figure 16:
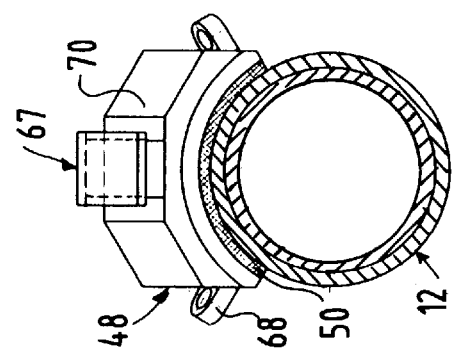
Figure 14:
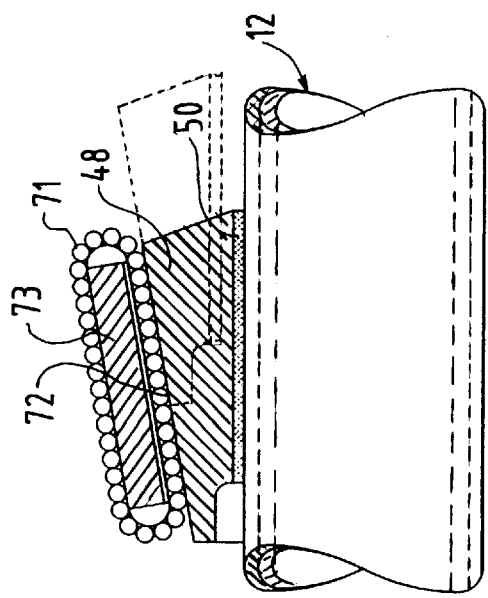
Figure 17:
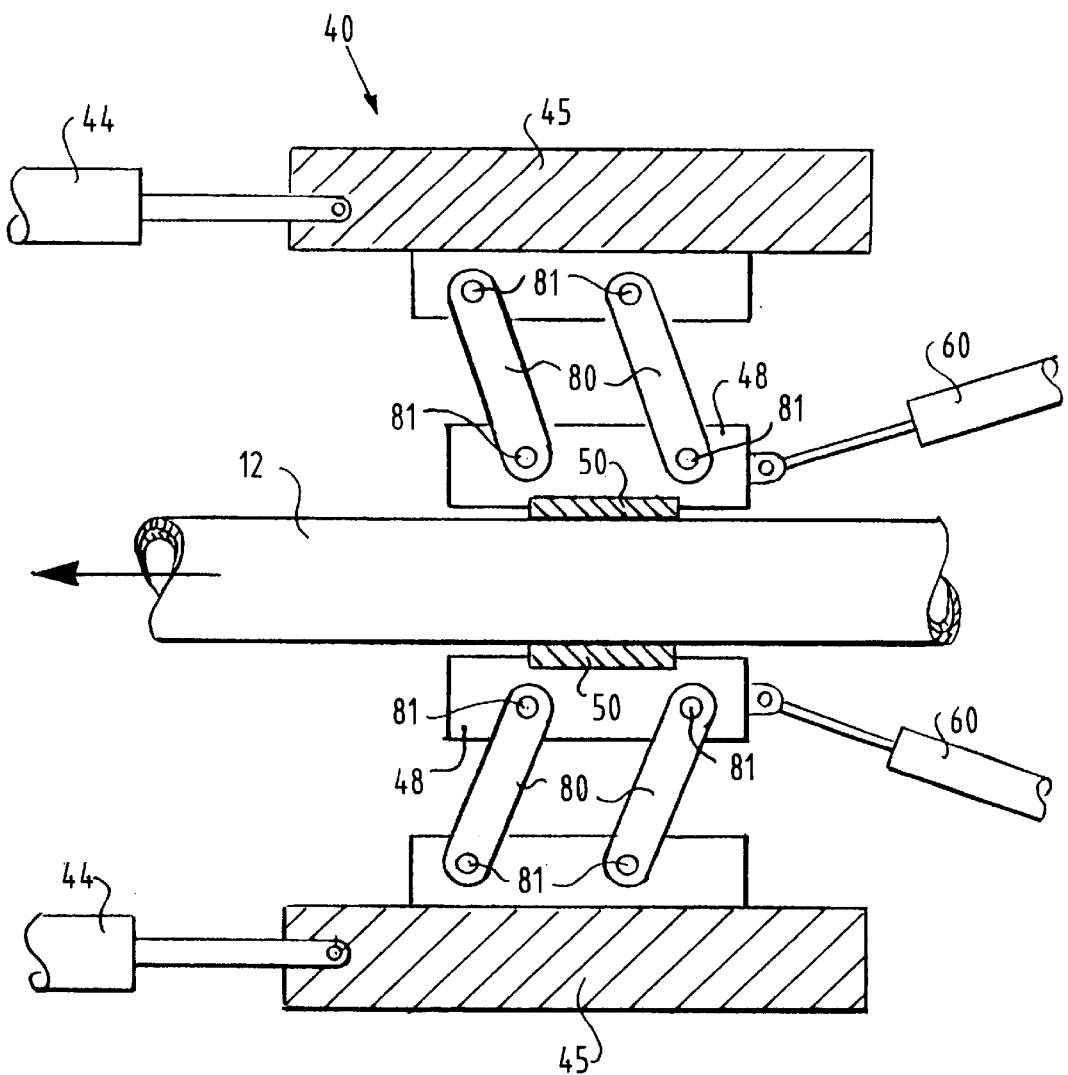

FIGS. 7, 8 and 9 each show a working diagram of four tensioners;

FIGS. 10 and 11 each show a time schedule relating to the energizing of four tensioners;

FIG. 12 shows a cross section corresponding with FIG. 4 through differently embodied tensioning means;

FIG. 13 is a side view of the tensioning means of FIG. 12;

FIGS. 14 and 15 show cross sections of FIG. 12 along line XIV—XIV respectively XV—XV;

FIG. 16 is a view according to arrow XVI of FIG. 15;

FIG. 17 is a schematic view of other differently embodied tensioning means; and

Figure 5:
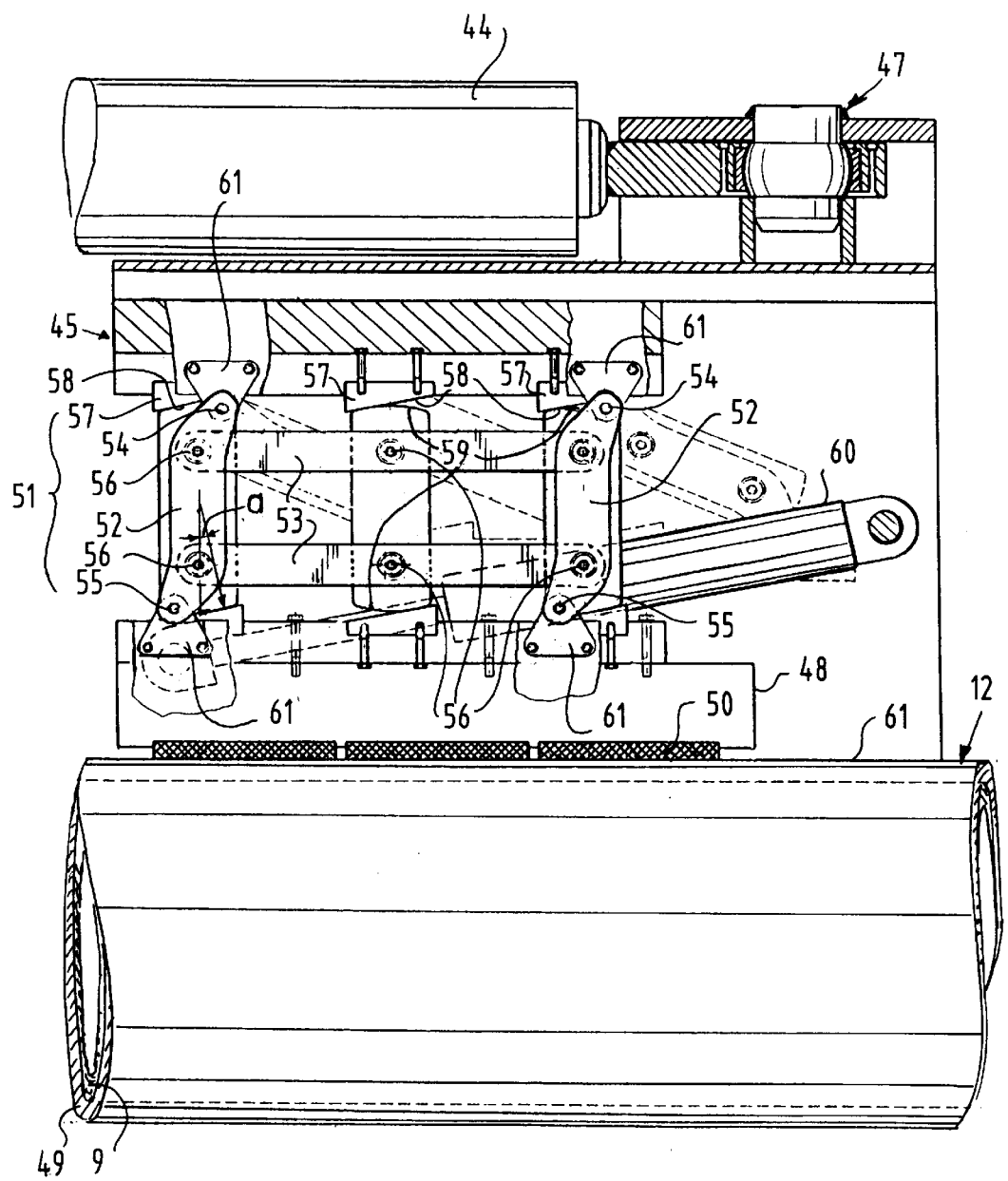
FIG. 5 shows cross section V—V of FIG. 4.
Figure 18:
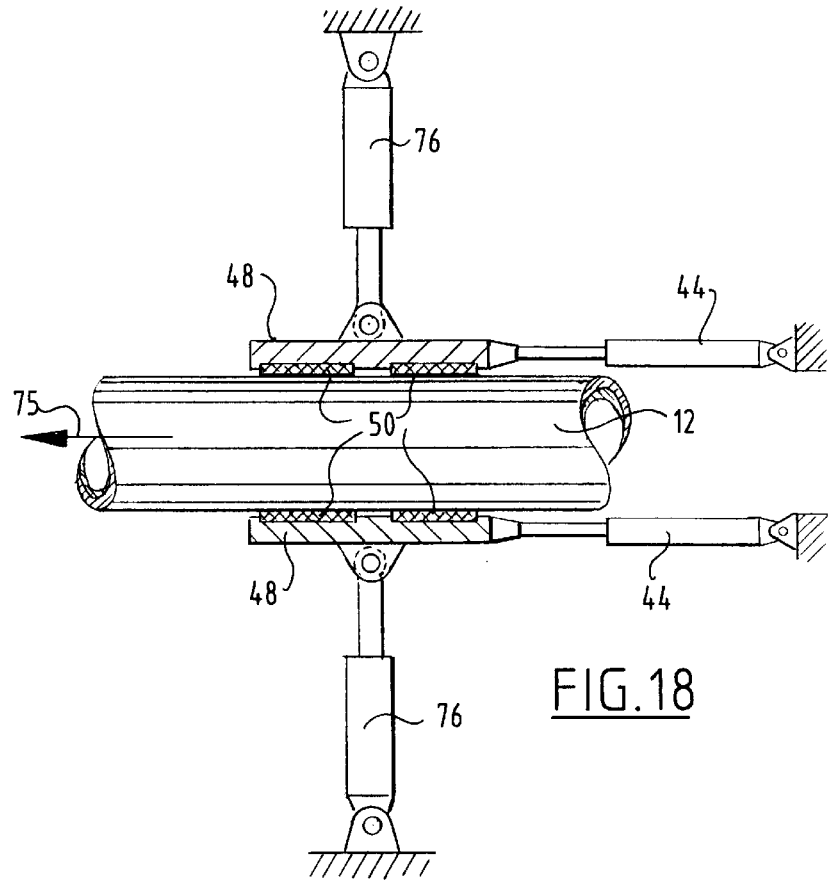
Figure 19:
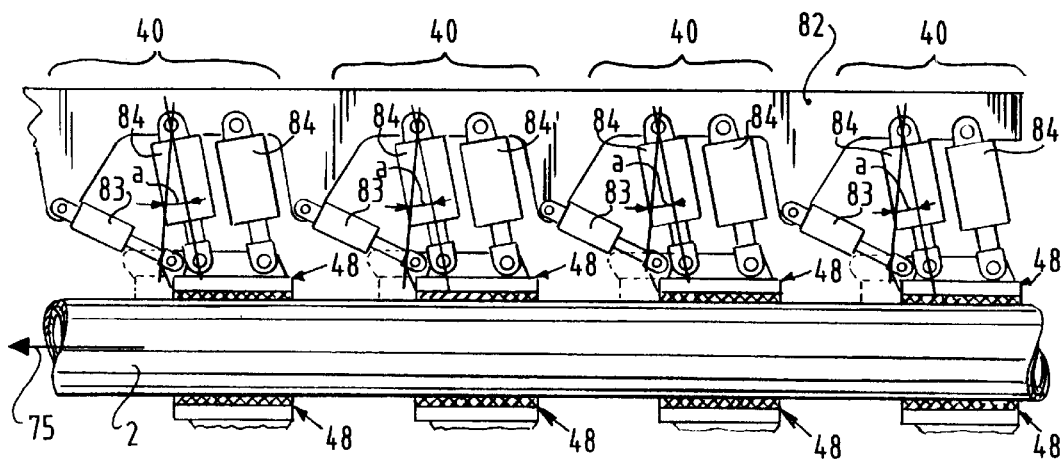

FIGS. 18 and 19 each show a cross section corresponding with FIG. 5 relating in each case to a different embodiment of the tensioning means.

Figure 1:
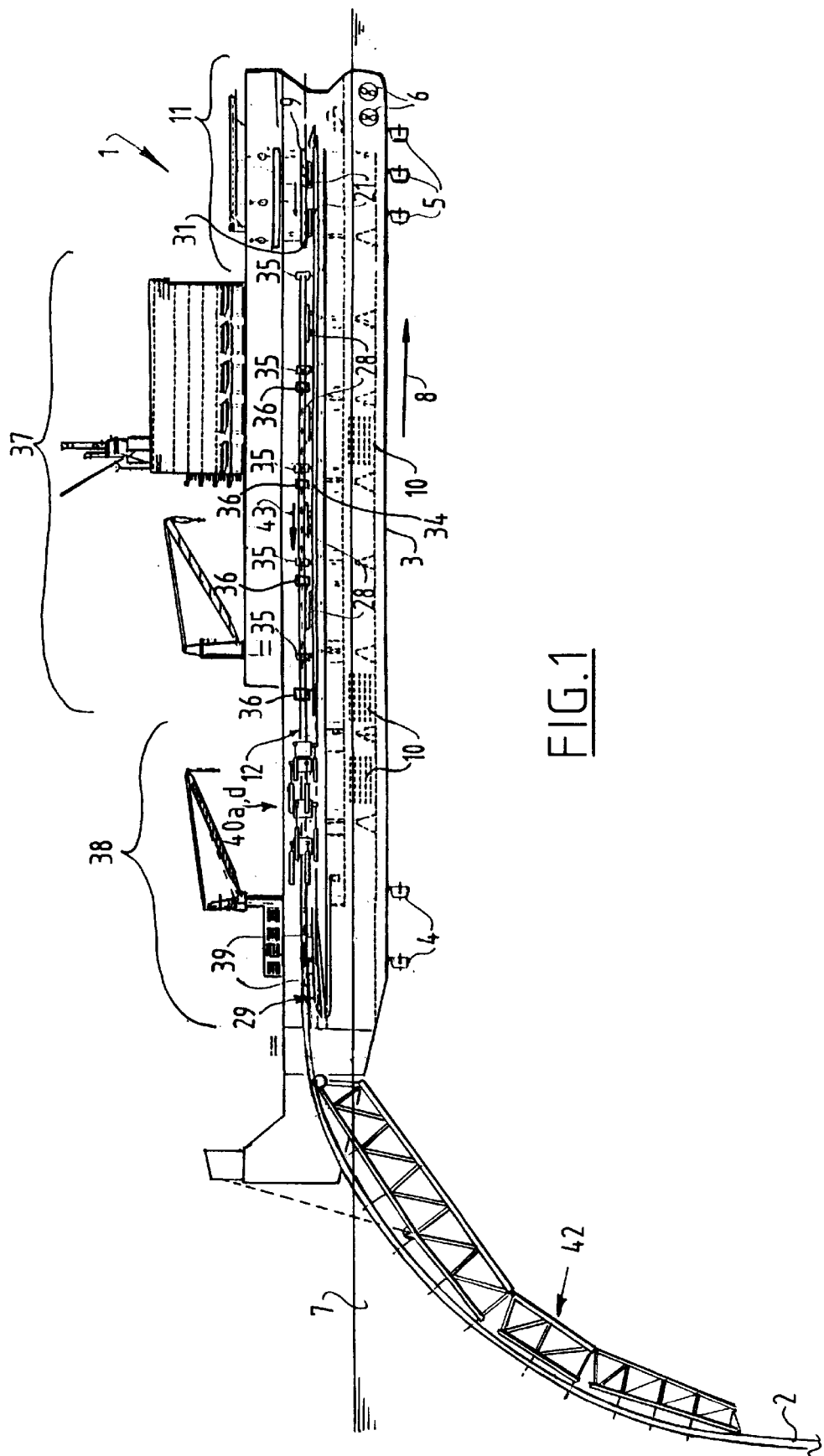
FIG. 1 shows a side view of an installation according to the invention.

The installation 1 of FIG. 1 for laying a pipeline 2 on a surface located deep under water 7 comprises a vessel 3 with directionally adjustable screws 4 and 5 and bow steering screws 6 with which the vessel 3 can be moved forward in arrow direction 8 under computer control at a set speed and direction irrespective of the flow direction of the water 7. The vessel 3 has a workplace (not shown) where a number, for example two, three or four, of pipe pieces are welded together and these welds protected with anticorrosive layers for the manufacture of pipes 9 with a length for example of 24 m.

At a fitting station 11 the pipes 9 are fitted piece by piece behind a pipeline 12 and an internal weld 13 is made. Other welding layers and the anticorrosive protective layers are then arranged successively from the outside.

While the pipeline 12 displaces continuously in arrow direction 43 relative to the vessel 3, the pipe 9 for fitting is pushed over a tongue, placed in alignment and welded in place with an internal weld. In the meantime the pipe 9 for fitting is supported by a carriage 21 which moves along with the pipeline 12 at the same speed in arrow direction 43, as does a support carriage 28. A chain conveyor 34 connecting onto a fixed support 31 is present with clamps 35 with which pipeline 12 is supported. Over the area 37 of the chain conveyor 34 the welding layers are laid with welding devices 36 which are likewise moved along with pipeline 12 and which at the end of their area 37 are moved in the opposite direction past operational welding devices 36 to the start of this area. In the area 38 adjoining thereto the protective layers are applied with per se known application devices 39 which are moved with pipeline 12 and which are moved back after finishing.

The weight of the pipe string 12, which is further guided away in sloping manner to a deep sea-bed via a tail unit 42, has the tendency to slide off the vessel and to sag in too sharp a bend. The vessel 3 is therefore strongly driven with its screws 4 such that the part of pipeline 12 suspended behind vessel 3 is under considerable tensile stress. Situated in the area 38 are tensioners 40a–d (FIGS. 2–6) which can be fixedly clamped independently of each other to pipeline 12 and which can support against the ship frame 41 by means of fluid cylinders 44. Each tensioner 40a–d comprises a triangular, annular support member 45 which is embodied as a sturdy frame and which is connected to fluid cylinders 44 via hinges 46. Each tensioner 40a–d has a plurality of at least two, for instance three, clamping jaws 48 distributed over the periphery and engaging on the pipeline 12, which are lined with a lining 50, for instance brake lining material, which has a considerable coefficient of friction on the outer surface 49 of the pipes 9. The clamping jaws 48 are guided for displacement relative to support member 45 by means of a parallelogram mechanism 51 consisting substantially of three parallel tensioning elements 52 which are connected at hinges 45 to parallel rods 53 for pivoting with some clearance and are connected for pivoting with some clearance to clamping jaws 48 at hinges 55 on one side and to a support member 45 at hinges 54 on the other side.

Further fixed to each clamping jaw 48 and to each support member 45 opposite each tensioning element 52 is a wedge 57, the wedge surface 58 of which co-acts with a roll surface 59 of a tensioning element 52. In the clamping position, wherein a fluid cylinder 60 urges the tensioning elements 52 into their clamping position, these tensioning elements 52 effect a clamping force K in a clamping direction which encloses a small angle a with the radial direction of pipeline 12. The tangent of angle a is preferably smaller than the coefficient of friction b between the outer surface of an outer jacket 49 and the lining 50.

If the tangent of angle a is greater than said coefficient of friction b, more tensioners 40 will have to be present and/or at least another one tensioner of another type will be required to hole the pipeline 12.

In the case the clamping force on the clamping jaws 48 engages centrally, the clamping jaws 48 are preferably formed with an inner radius which is slightly smaller than the outer radius of pipe string 12 so that after tensioning of the clamping jaws 48 onto pipeline 12 the surface tension is distributed roughly uniformly over the clamping surface. There are at least two, but preferably three, four or more tensioners 40 present.

Figure 6:
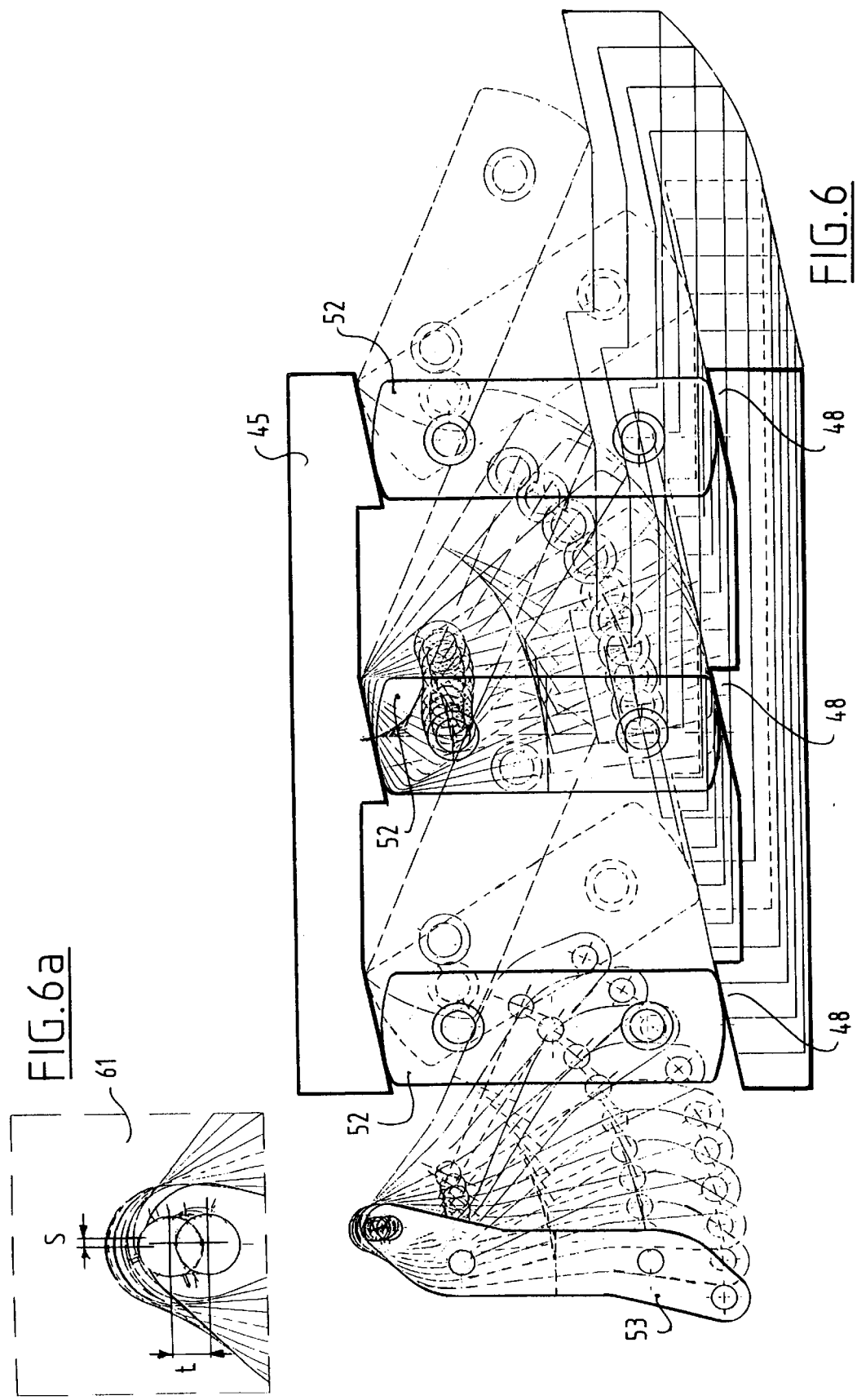
FIG. 6 shows a diagram of diverse mutual positions of elements of FIG. 5.

Shown in FIG. 6 are the successive positions of a clamping jaw 48, tensioning elements 52 and rods 53 relative to a support member 45, wherein in FIG. 6A is shown on larger scale the displacement of a hinge 54 relative to a support member 45, which means that the required freedom of movement S of for instance 3–4 mm and a freedom of movement t of for instance 20 mm are present there. To this end the hinge 54 contains a rubber bearing cushion.

In the case of three clamping jaws 48 per tensioner, successive tensioners 40 are shifted through an angle of 60° relative to each other in order to reduce the required space.

FIG. 7 shows schematically the successive steps of operation of the cylinders 44, wherein the energizing or non-energizing of tensioners 40 is designated in the fixedly clamped position and in the released position respectively with black wedges 57a and white wedges 57b. In FIG. 7 at least two tensioners 40 at a time are always energized, which then hold pipeline 12 in fixedly clamped position, while the hydraulic cylinders 44 provide power as easing holding means.

The same is shown in FIG. 8, although now in combination with pipe thickening 62. FIG. 8 shows that it is possible to allow the strengthening means 62 to pass through without fixedly clamping the pipeline 12 at that position.

FIG. 9 shows schematically the same as FIG. 7, but such that now three tensioners 40 are continuously in clamping condition instead of two. The holding capacity is in this case for instance 3×400=1200 tons, i.e. a higher holding capacity at a lower displacement speed.

FIG. 9 shows how the released set of clamping jaws 57b are reset from the releasing position 57b to the starting position 57b1, whereafter in a following step these same clamping jaws are clamped on and are then held fixedly in already easing manner.

FIGS. 10 and 11 show by means of line E the speeds D in m/minute for the four tensioners 40 plotted against the time in seconds, in combination with the clamping condition closed (line portion F) and open (line portion G).

The embodiment variants of tensioners 40 according to FIGS. 12–16 comprise wedge-shaped clamping jaws 48 which are each guided in a guide 65 of the annular frame 66 of a tensioner 40 using their guide element 67 and which are urged into and out of their tensioning position by means of fluid cylinders 60 which engage on ears 68. Each clamping jaw 48 has two wedge surfaces 70, wherein a roller chain 71 supports against an internal wedge surface 72 of a frame element 73 of the substantially triangular, annular support member 45, which frame element 73 inclines in the same direction as wedge 48. The roller chain 71 could be replaced by a straight series of rollers enclosed in an elongate roller cage.

According to FIG. 17 a pipe string 12 is held fixedly by means of clamping jaws 48 which are urged into their clamping position by sturdy parallel rods 80 which engage on these clamping jaws 48 and on an annular support member 45 by means of sturdy hinges 81. The support member 45 of each tensioner 40 is again displaced by means of cylinders 44.

Using the tensioners 40 according to the invention a heavy pipe string 12 can be laid at a depth of several kilometers on a sea-bed. Pipeline 12 then weighs for instance 1200 tons, which is supported in each case by for instance three tensioners 40 simultaneously.

In the above stated embodiments the pipeline 12 is supported in each case by a supporting body which is the vessel 3 of a pipe-bedding installation.

It is conceivable for the pipe string to be substantially or at least partially supported by a trunk having much lifting power which is situated in the water beneath the tail unit 42. In this case the fluid cylinders 44 engage between contact points on the trunk on one side and ring frames 45 of tensioners 40 on the other.

According to FIG. 18 a pipeline 12 is held fixedly by for instance four sets of clamping jaws 48, of which only one set is drawn, which are clamped onto pipeline 12 in radial direction, for instance by means of hydraulic cylinders 76. Herein the clamping jaws 48 are held directly by fluid cylinders 44. During clamping on of clamping jaws 48 by means of cylinders 76 the clamping jaws 48 move in the direction of arrow 75 while cylinders 44 exert a holding force thereon. During the subsequent release of clamping jaws 48 they are retracted by cylinders 44 while pipeline 12 is then held fixedly by three other sets of clamping jaws 48.

Instead of fluid cylinders winches with cables can also be employed, wherein the holding energy of the then paying out winches is then converted into electrical energy in for instance electric generators.

The invention can also be applied with other pipeline delivery methods than that wherein the pipeline is delivered in an S-shape. The invention can thus also be applied in a method wherein a pipeline is rolled up on a large reel and unwound from this reel.

The pipeline 12 can be delivered from pipe layer 1 continuously or intermittently.

According to FIG. 19 the pipeline is held fixedly with four tensioners 40, each consisting of two, three or more clamping jaws 48 distributed over the periphery. Each clamping jaw 48 is connected via a hydraulic cylinder 83 and two hydraulic cylinders 84 to a frame 82 mounted fixedly on vessel 3. During normal operation at least two of the tensioners 40 are always clamped onto the pipeline 2 and in the case of calamity at least three.

The cylinders 84 of the clamped tensioners 40 mainly provide the clamping force but also a holding force, while cylinder 83 provides mainly a holding force in the clamped-on situation.

Cylinders 83 further provide for resetting of clamping jaws 48 when cylinders 84 are not energized. These tensioner 40 are easy to adapt to diverse coefficients of friction of pipelines 2 by choosing the starting position for clamping of clamping jaws 48 such that the tangent of the angle a of cylinders 84 is smaller than this coefficient of friction. Particularly if many, for instance six, clamping jaws 48 are used per tensioner an ideal grip is obtained on the pipeline, even in the case of different diameters or non-roundness of the pipeline. These tensioners can be constructed compactly with high tensioning capacity.

If desired, the pipeline 2 can be released with certainty at any moment, for instance in the case of calamity, by de-energizing all cylinders 83 and 84.

We claim:

1. Apparatus for laying a pipeline on a surface located under water, comprising a carrier body, which is supported by upward pressure and provided with tensioning means for fixedly holding the pipeline, which tensioning means extend between at least one clamping member engaging on the pipeline and at least one support member connected to the carrier body supported by upward pressure, characterized by at least one first and at least one second set of clamping jaws which can be clamped fixedly to the pipeline and which can move along with the pipeline in fixedly clamped position from a starting position into a releasing position, while said sets of clamping jaws are connected to easing holding means, wherein said sets of clamping jaws are alternatingly clampable and releasable and in released position are resettable from the releasing position to the starting position, and further characterized in that said tensioning means comprise a plurality of roller elements which each roll over a wedge surface.

2. The apparatus of claim 1 characterized in that at least one plurality of roller elements is mutually coupled by means of at least one coupling rod.

3. The apparatus of claim 2 characterized in that at least one plurality of roller elements is mutually coupled by means of at least two coupling rods.

4. Apparatus for laying a pipeline on a surface located under water, comprising a carrier body, which is supported by upward pressure and provided with tensioning means for fixedly holding the pipeline in a clamped position which tensioning means extend between at least one clamping member engaging on the pipeline and at least one support member connected to the carrier body supported by upward pressure, characterized by at least one first and at least one second set of clamping jaws which can be clamped fixedly to the pipeline and which can move along with the pipeline in fixedly clamped position from a starting position into a releasing position, while said sets of clamping jaws are connected to easing holding means, wherein said sets of clamping jaws are alternatingly clampable and releasable and in released position are resettable from the releasing position to the starting position, and further characterized in that a plurality of sets of tensioning means is present which can be carried independently of each other into and out of a fixedly clamped position and each of which is connected to a carrier body via at least one coupling member which is changeable in length.

5. The apparatus of claim 4 characterized in that the tensioning means comprises a plurality of pivoting rods.

6. The apparatus of claim 4 characterized in that said tensioning means can be removed from said clamped position by means of a power unit.

7. Apparatus as claimed in claim 4 wherein in at least one clamping location at least two sets of tensioning means are distributed over the periphery of the pipeline.

8. Apparatus as claimed in claim 4 characterized in that at least one set of tensioning means has a plurality of clamping jaws which are distributed over the periphery of the pipeline and which are each connected to the carrier body of the pipeline by hydraulic cylinders.

* * * * *